(12) United States Patent
Marioni

(10) Patent No.: US 8,127,428 B2
(45) Date of Patent: Mar. 6, 2012

(54) PROCEEDING FOR THE MANUFACTURING OF A STATOR FOR AN ELECTRIC MOTOR AND OF AN ELECTRIC MOTOR

(75) Inventor: Elio Marioni, Dueville (IT)

(73) Assignee: Askoll Holding S.r.l. (IT)

( * ) Notice: Subject to any disclaimer, the term of this patent is extended or adjusted under 35 U.S.C. 154(b) by 195 days.

(21) Appl. No.: 12/504,087

(22) Filed: Jul. 16, 2009

(65) Prior Publication Data

US 2010/0026134 A1 Feb. 4, 2010

(30) Foreign Application Priority Data

Jul. 30, 2008 (EP) ..................................... 08425522

(51) Int. Cl.
*H02K 15/00* (2006.01)
(52) U.S. Cl. ........ 29/596; 29/597; 29/598; 310/216.058
(58) Field of Classification Search ............ 29/596–598, 29/732, 605–606; 310/216.058, 258
See application file for complete search history.

(56) References Cited

U.S. PATENT DOCUMENTS

| | | | |
|---|---|---|---|
| 3,983,433 A | | 9/1976 | Sims |
| 4,546,282 A | * | 10/1985 | Hartwig ................. 310/216.063 |
| 6,081,059 A | * | 6/2000 | Hsu ................................. 29/596 |
| 7,221,072 B2 | * | 5/2007 | Ahn ................................. 29/596 |

FOREIGN PATENT DOCUMENTS

| | | |
|---|---|---|
| DE | 102004013869 A1 | 10/2005 |
| EP | 1420498 A1 | 5/2004 |
| FR | 2531820 A | 2/1984 |

* cited by examiner

*Primary Examiner* — Minh Trinh
(74) *Attorney, Agent, or Firm* — Akerman Senterfitt

(57) ABSTRACT

A process for manufacturing an outer stator for an electric motor whereby the stator comprises stator poles surrounded by coils. A laminar body of ferromagnetic material is prepared, with elongated form and provided with laminar protrusions. A coil of conductive material is then inserted around each of the laminar protrusions. The terminal zones of the laminar protrusions are then cut or separated and deformed in order to assume an outwardly curved form. Then, the laminar body is closed such that the laminar protrusions are in an internal position and adapted to serve as stator poles.

17 Claims, 18 Drawing Sheets

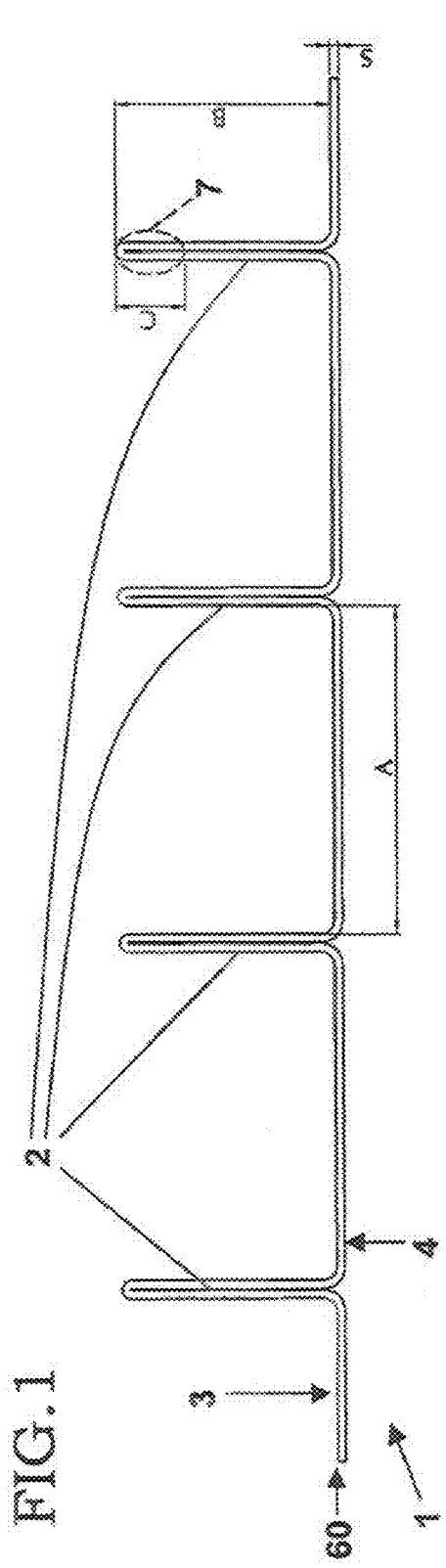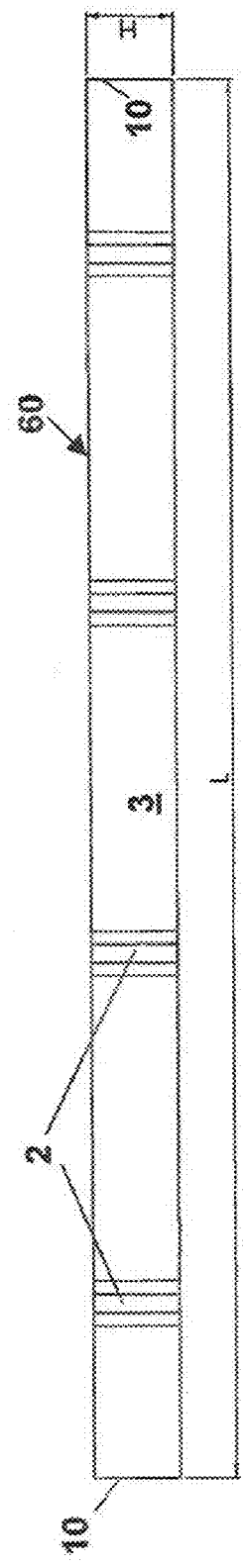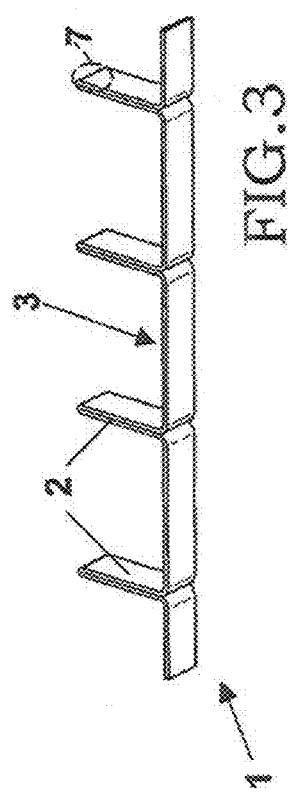

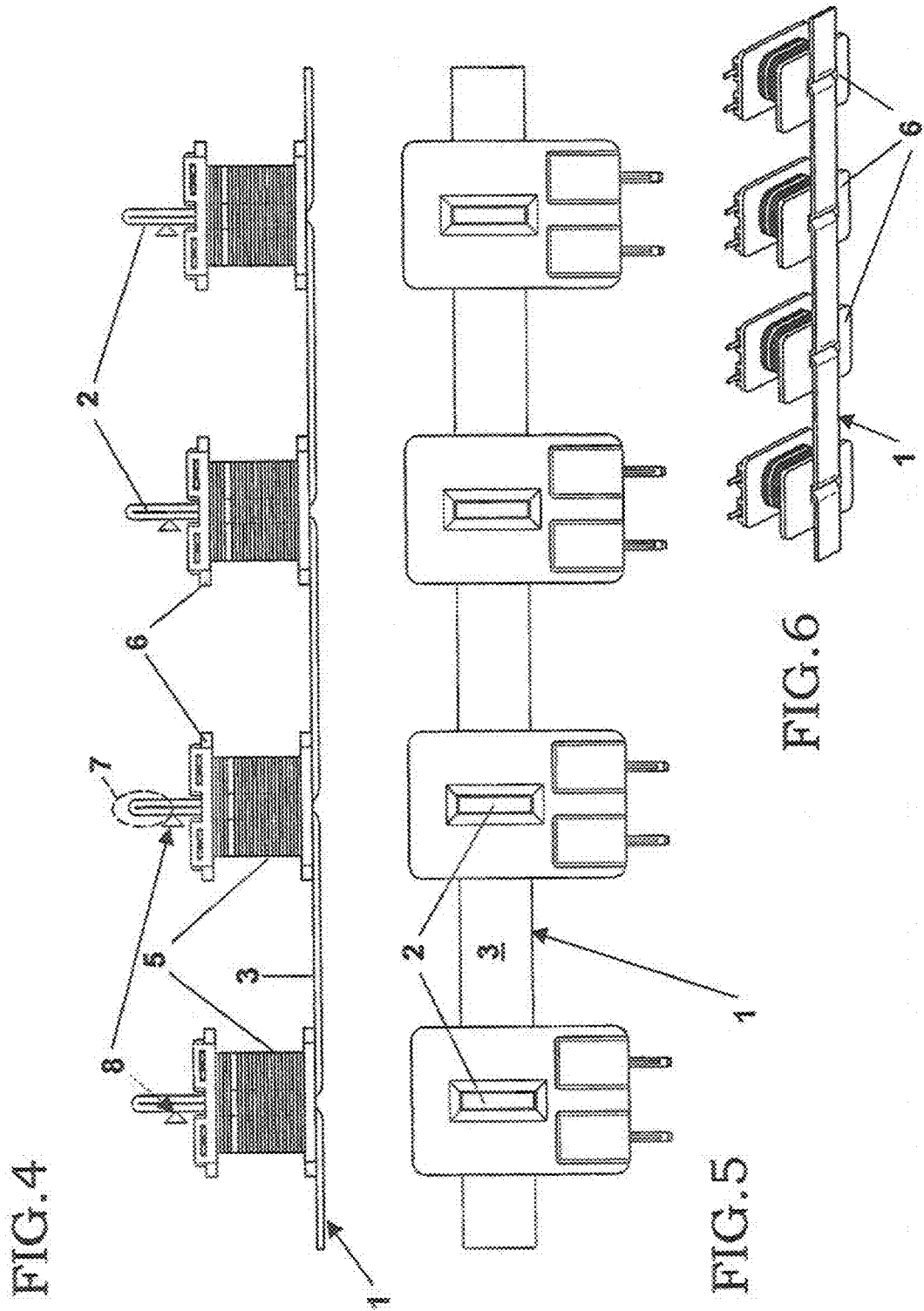

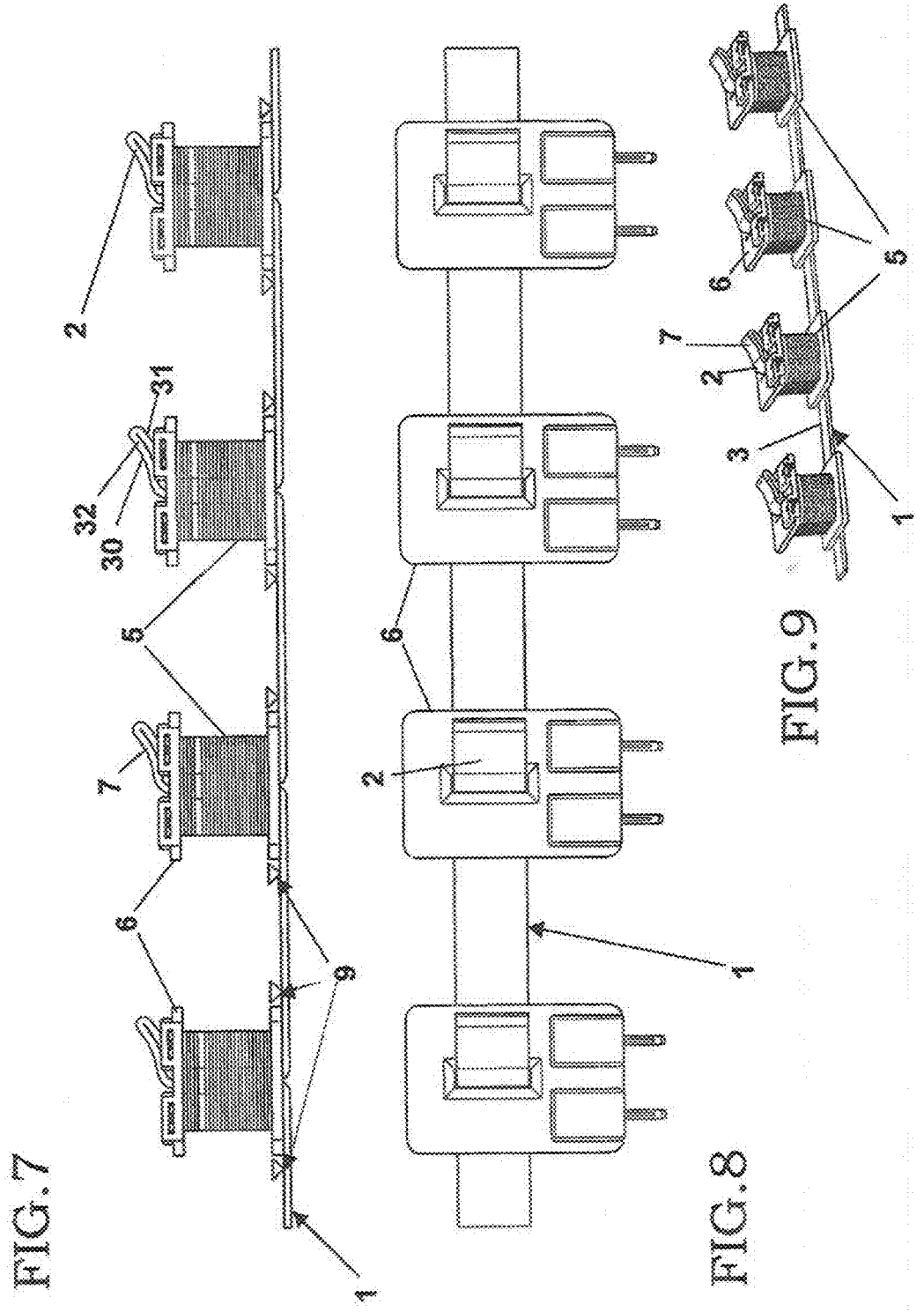

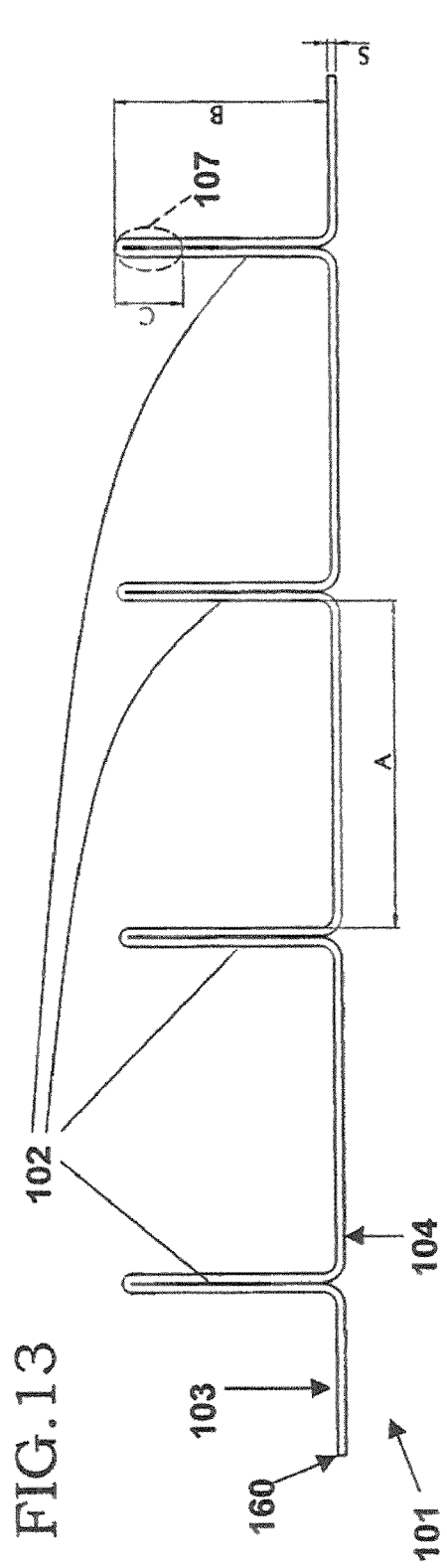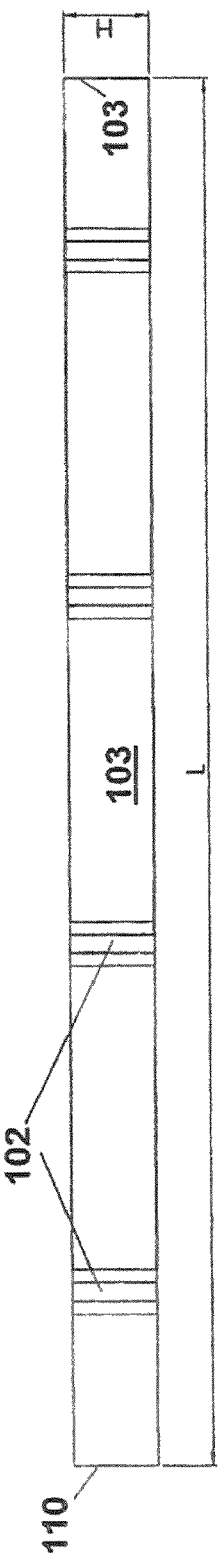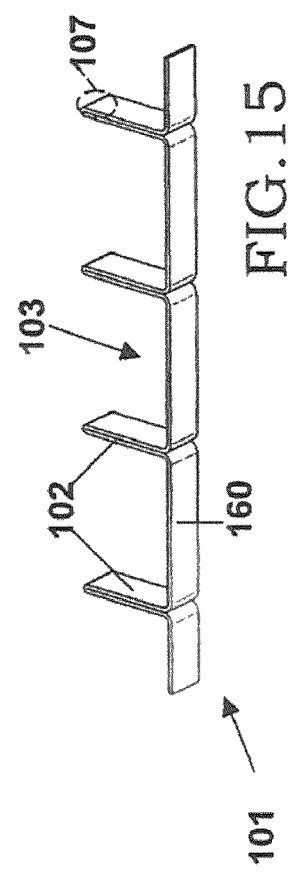

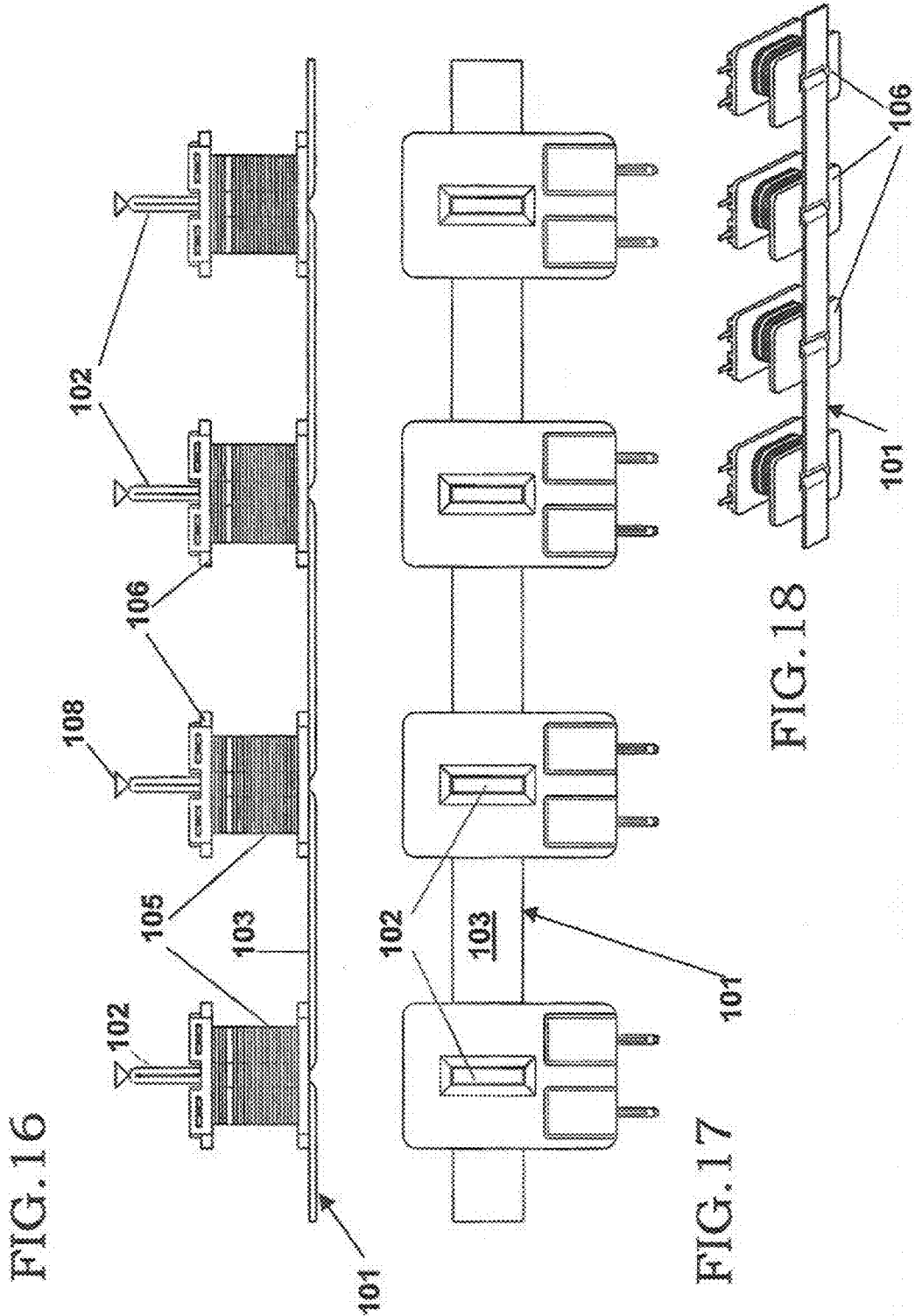

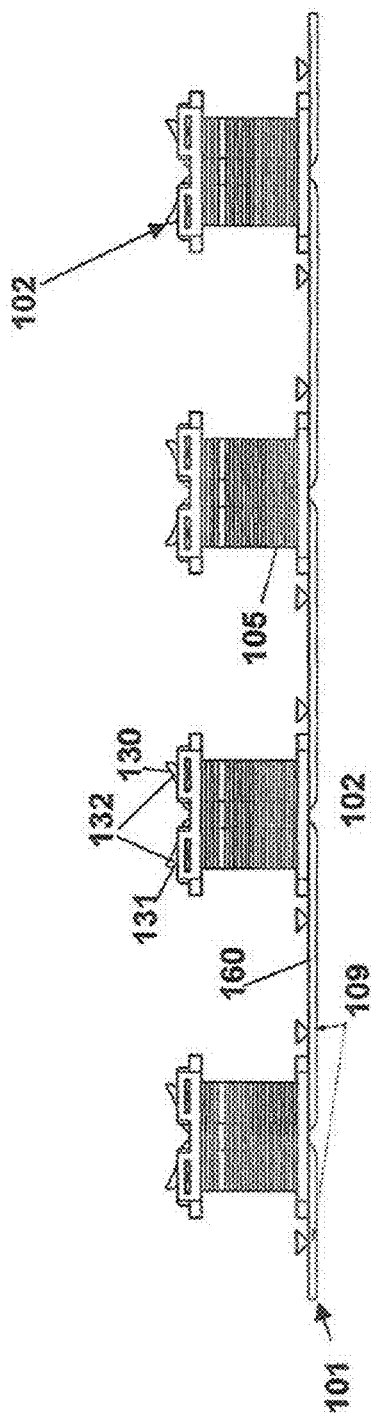
FIG. 19
FIG. 20
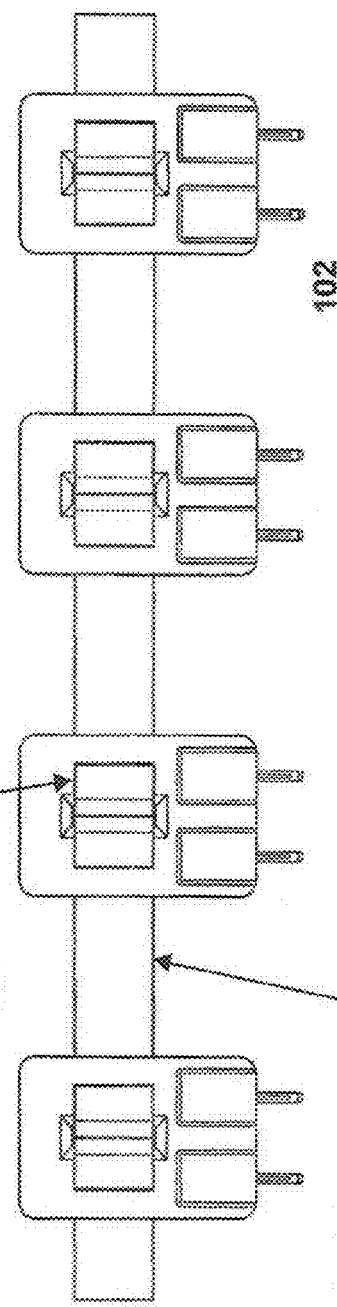
FIG. 21

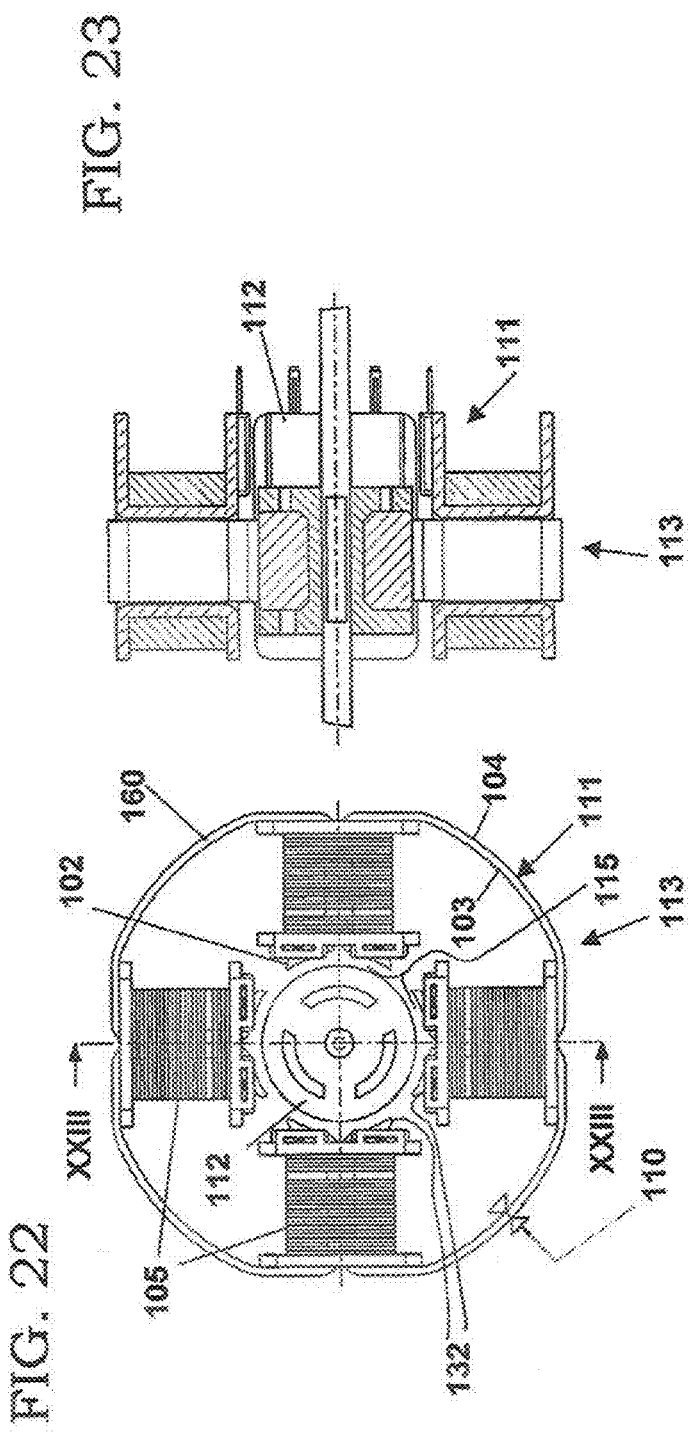
FIG. 22
FIG. 23
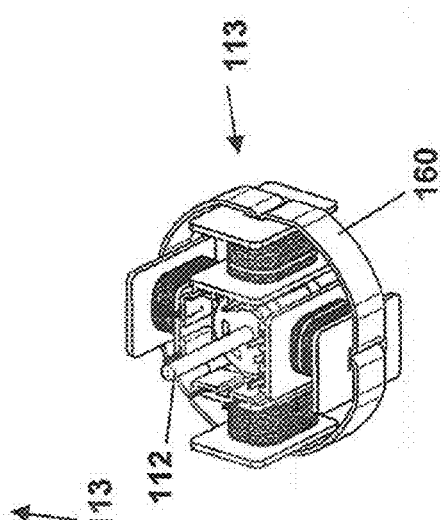
FIG. 24

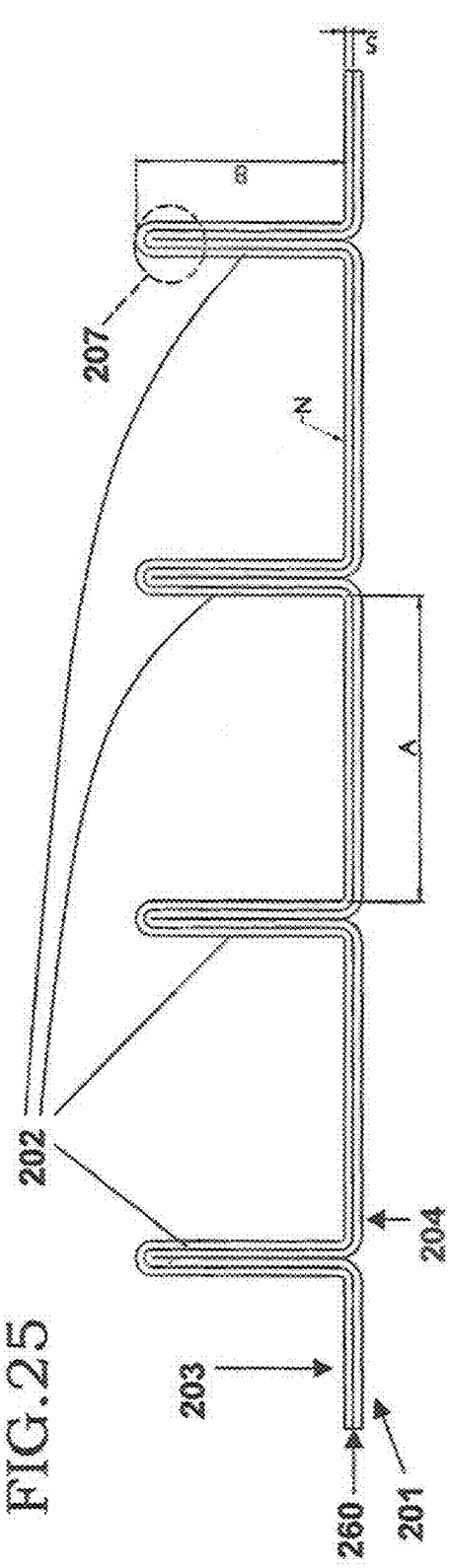
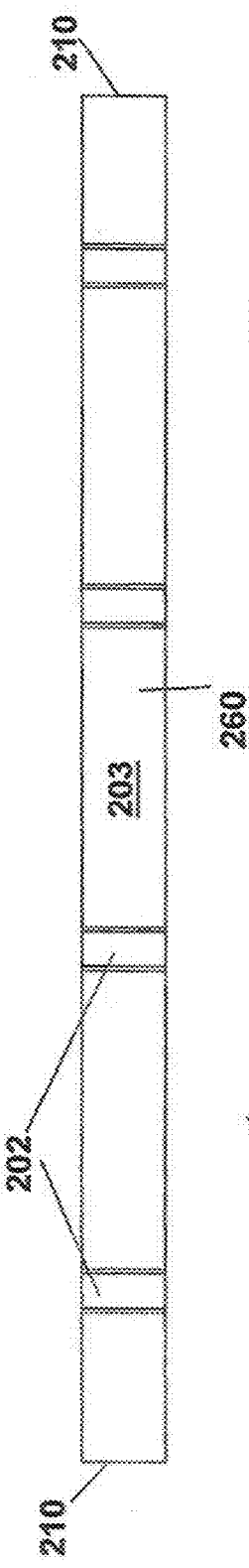
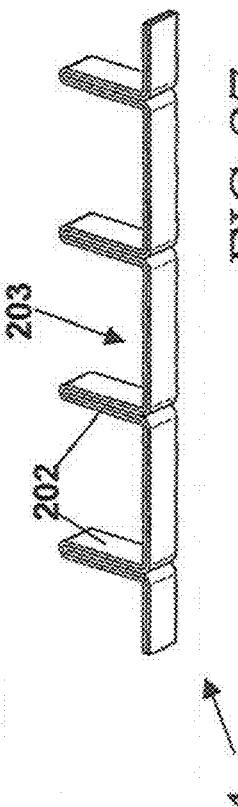

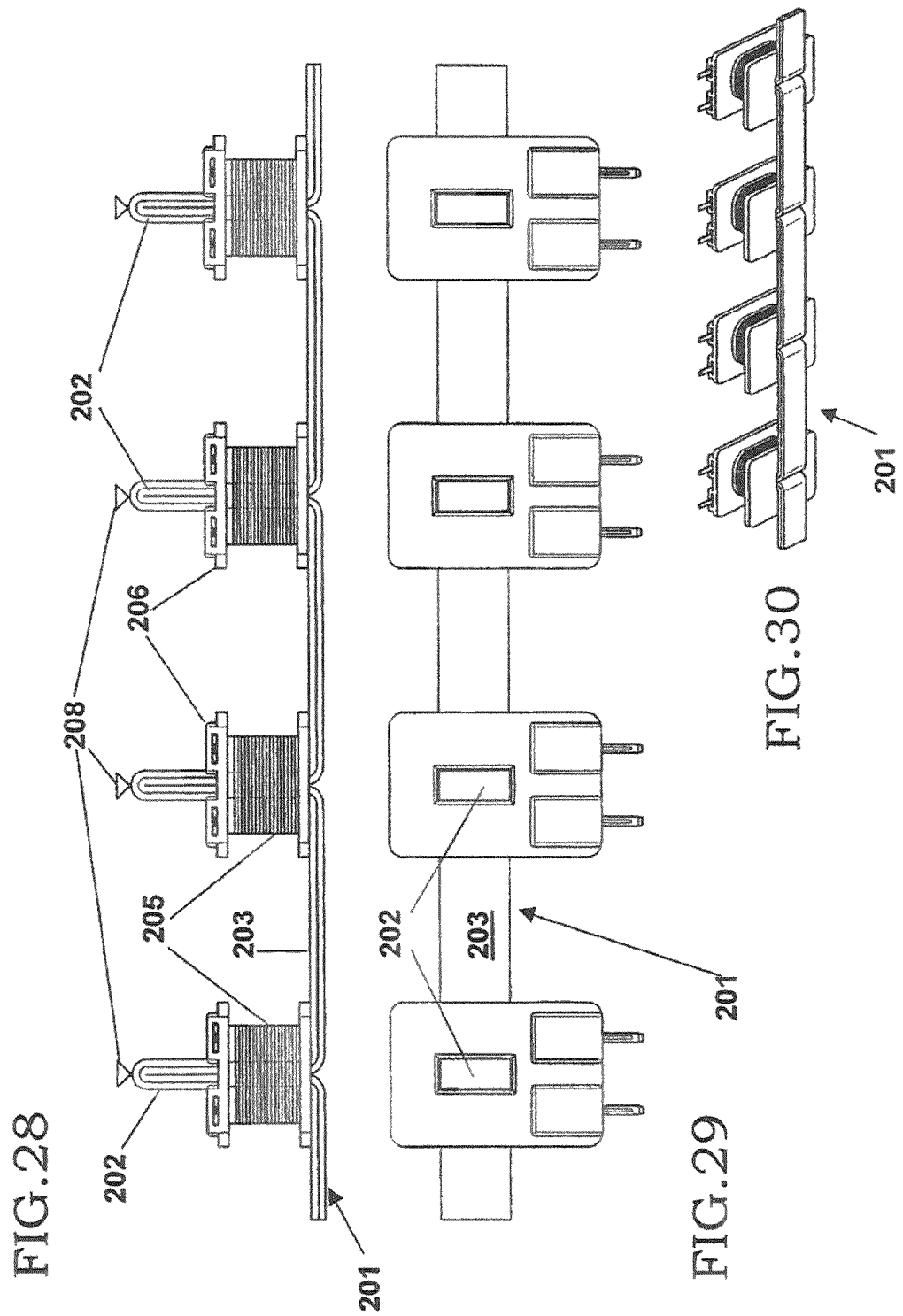

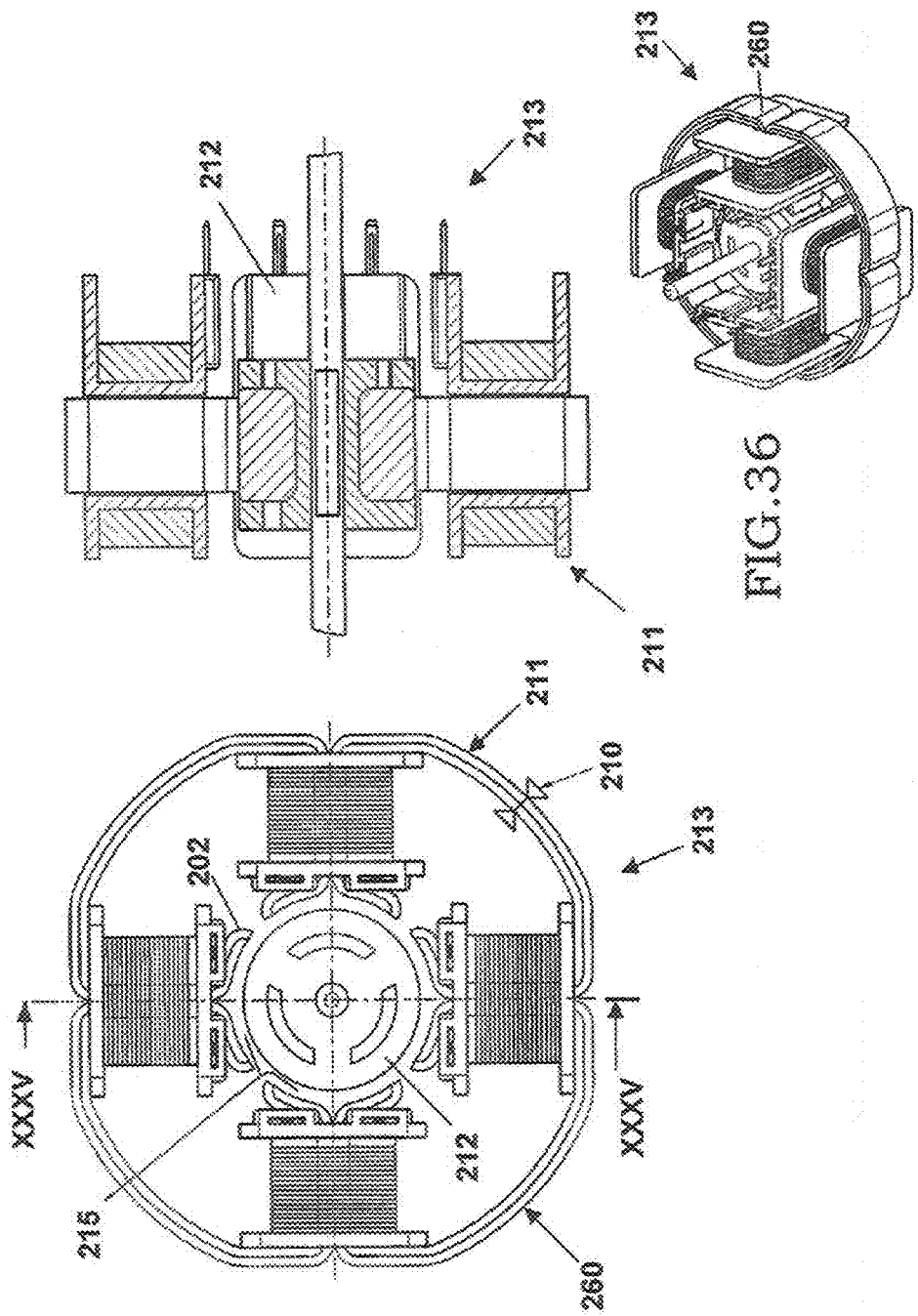

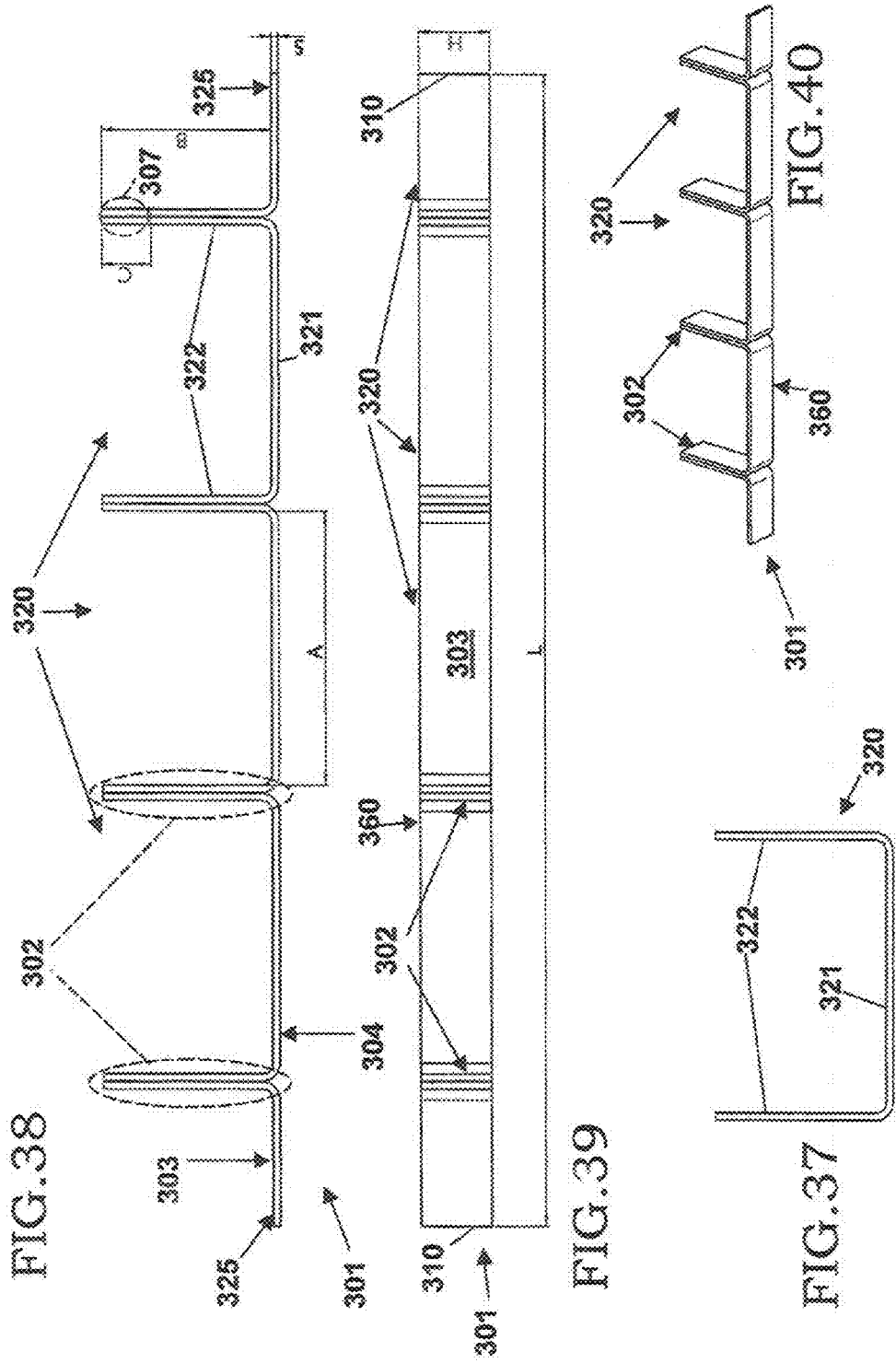

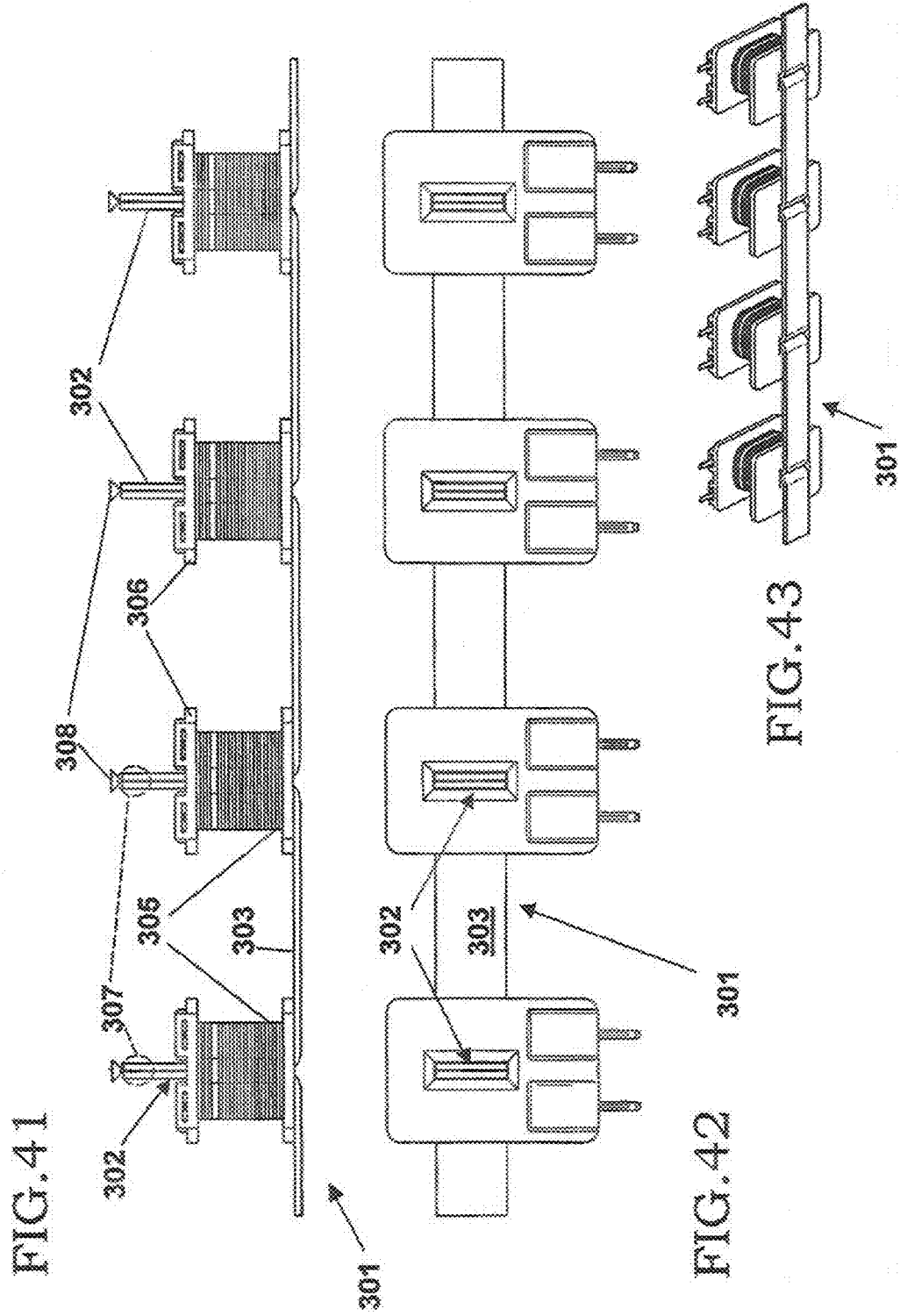

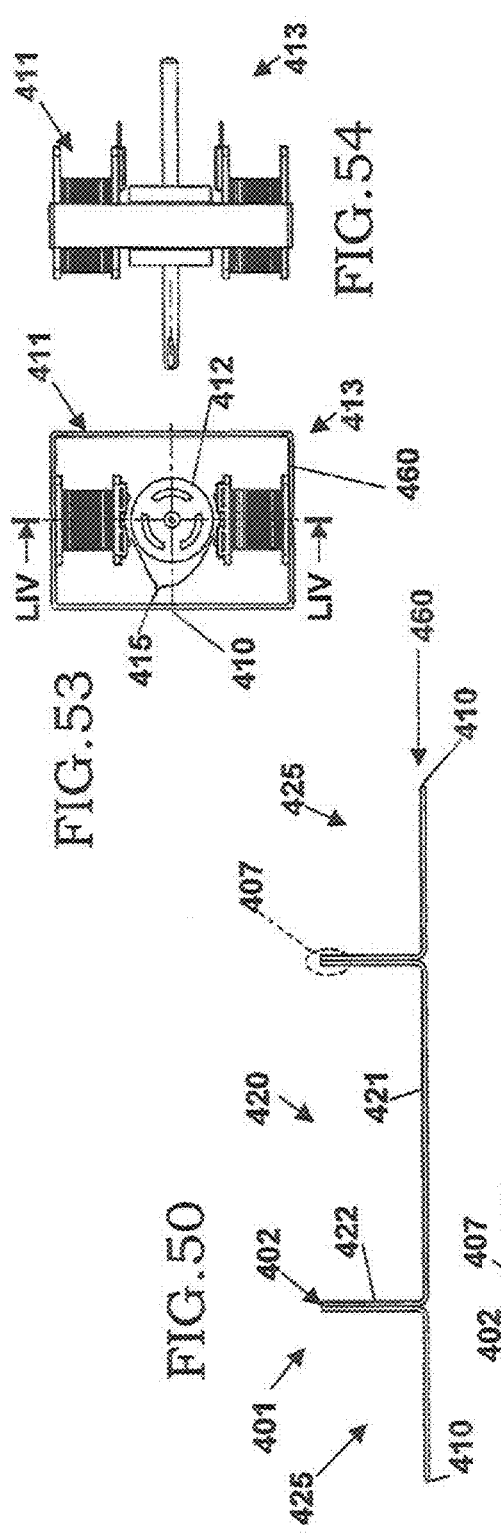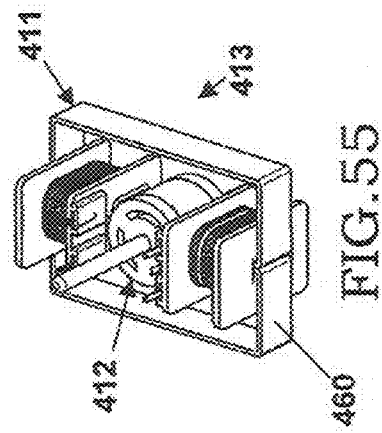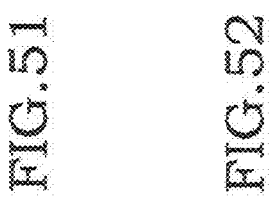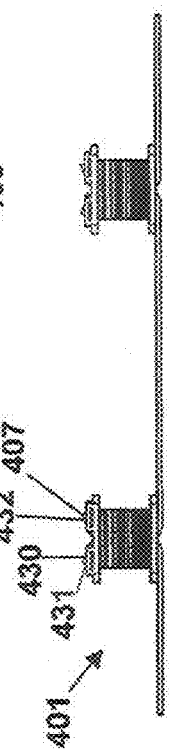

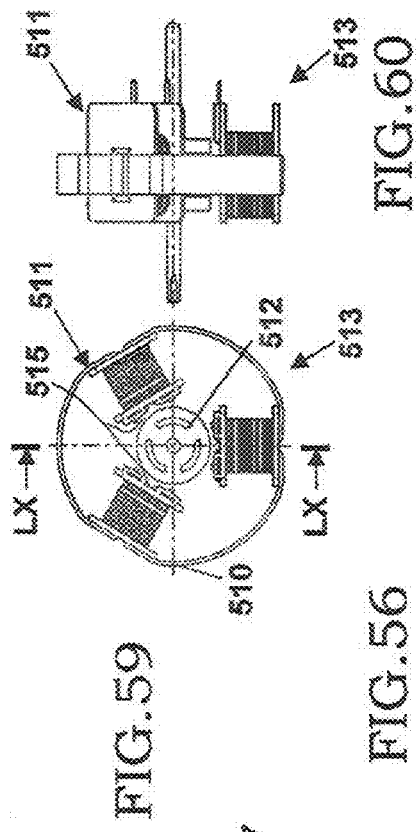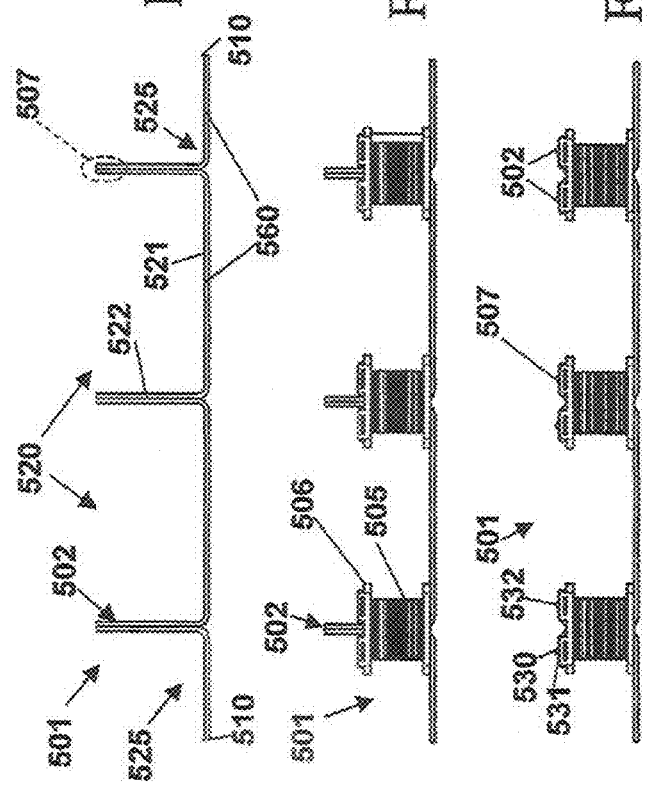

PROCEEDING FOR THE MANUFACTURING OF A STATOR FOR AN ELECTRIC MOTOR AND OF AN ELECTRIC MOTOR

FIELD OF APPLICATION

The present invention refers to a process for manufacturing a stator for an electric motor and to the process for manufacturing an electric motor.

The present invention also refers to an outer stator for an electric motor, and to a related electric motor, in particular of synchronous type.

PRIOR ART

An electric motor is known comprising an outer stator and an inner rotor, coaxial with the stator and separated from the latter by means of the interposition of an air gap.

The stator comprises a ferromagnretic core, with poles inwardly directed and, protruding towards the rotor, polar ends having the typical polar expansion form, i.e. rounded towards the air gap, or shaped so to tend to wrap around and enclose the rotor, reducing the air gap to the minimum.

The poles are surrounded by coils of electrically conductive material, which are supplied with electric current which magnetises the poles and forces an electromagnetic interaction with the rotor.

The rotor comprises electromagnetic interaction means which are in particular concreted in permanent magnets.

Thus, the electromagnetic interaction that is formed between the stator and rotor, if appropriately controlled through controlling the coil supply current, forces the rotation of the rotor around its own axis.

In particular, the synchronous motors, which have a rotating magnetic field at the air gap, have a known problem upon starting, since already in starting phase such rotating magnetic field rotates at synchronous speed, so that it is hard for the rotor to be immediately coupled to the synchronous speed; moreover, in the single-phase motors, the magnetic field is in reality not rotating, but pulsating, equal to the resultant of the two magnetic fields rotating in opposite directions, which signifies that, at the starting, the motor is induced to remain stopped. Thus, the starting of the synchronous electric motor requires known expedients, such as the electronic control of the coils, the use of mechanical means due to which the rotor is initially released from the load, the asymmetry of the pole pieces or ferromagnetic core, the second starting step.

A such electric motor is suitable for a discharge electropump, for example for a household appliance device, or for an electric motor pump of a circulator, for example for a boiler.

The prior art comprises numerous processes for manufacturing electric motor.

For example, according to one technique, the pole ends are made as separate components with respect to the rest of the stator, so as to facilitate the insertion of the coils, and to apply the pole ends afterwards in another moment. The pole ends are made by means of shearing.

New ferromagnetic materials are also known of grain-oriented type, due to which a small reluctance of the pole pieces are obtained, along with therefore an improved magnetic flux support.

There are, however, several drawbacks.

Indeed, the shearing involves the generation of scraps, which represent a waste product, rendering such prior art not very efficient. In addition, industrial slicers are very costly, and it would therefore be preferable to avoid their use, above all for manufacturing economical electric motors. Moreover, the operation of applying the pole ends is not easy, and requires connection means, for example of mortise and tenon type, which introduce further complication for the manufacturing of electric motors of the aforesaid type, as well as decrease the reliability of the motor thus achieved.

Moreover, the grain-oriented ferromagnetic materials require that such crystals are actually oriented in the direction in the magnetic flux, i.e. with crystal orientation coaxial with the pole axis, which makes the manufacturing of electric motors incorporating such crystals difficult.

The technical problem underlying the present invention is therefore that of devising a process for manufacturing an electric motor which allows avoiding the shearing process and is simplified.

SUMMARY OF THE INVENTION

Such technical problem is solved by a process for manufacturing an outer stator for an electric motor, the stator comprising stator poles surrounded by coils, the process including the following steps:

preparing a laminar body, in ferromagnetic material, with an elongated base and with laminar protrusions;

inserting a conductive material coil around each laminar protrusion;

deforming the terminal zones of the laminar protrusions so that the terminal zones have a bent form;

closing the laminar body so that the laminar protrusions are in internal position and adapted to serve as stator poles.

In this manner, a stator is simply obtained by starting from a strip of ferromagnetic material. In particular, the base of the laminar body becomes the ferromagnetic stator core and the laminar protrusions become the stator poles. Preferably, each coil is wound around a respective reel which is inserted on each laminar protrusion.

Preferably, the bent form thus obtained of the lateral protrusions is curved/rounded, and preferably suitable for giving said terminal zones the common pole piece form, adapted to wrap around or enclose an external cylindrical body.

The step of preparing a laminar body preferably comprises or consists of bending a laminar strip, single-layer or with several layers, i.e. multiple layer, with the definition of the laminar protrusions; the laminar strip has a substantially very reduced thickness with respect to the other dimensions of said strip.

According to a preferred embodiment, the step of preparing a laminar body preferably comprises the following operations:

preparation of a plurality of modular laminar elements, each of which comprising a central plate and a pair of lateral plates; preferably, end elements are also prepared, in particular formed by cutting a further modular laminar element;

modular application of the modular application elements by means of juxtaposition and/or mutual fixing at the lateral plates, so as to form said laminar protrusions.

It is preferable that the latter operation is carried out without welding, so to prevent the welding material, which is metal, from negatively affected the path of the magnetic flux.

Each modular laminar element and each end element is preferably obtained by means of bending and cutting operations, of a laminar strip, single-layer or with several layers i.e. multiple layer.

According to one embodiment, the step of deforming the terminal zones of the laminar protrusions comprises or consists of bending the terminal zones of the laminar protrusions.

According to a further embodiment, the step of deforming the terminal zones of the laminar protrusions comprises both a cutting or separation operation of said terminal zones of the lateral protrusions, preferably obtainable by means of blade means, and a bending operation of the terminal zones of the lateral protrusions, preferably obtainable by means of a bending machine.

Preferably, the terminal zones comprise tongues, with a forward surface that is preferably curved and capable of enclosing an external cylindrical surface, and a back surface, which is preferably in contact with the reel with coil wound thereon, so that the reel cannot be extracted from the laminar protrusion, and in turn the reel locks the tongues, which thus remain locked.

The present invention allows avoiding shearing operations, and, thus, not employing the slicing machine, which is costly; in its place, a cutting/bending group can be employed, which is much less expensive.

The laminar strip is preferably traditional iron. While in theory this is a material with magnetic characteristics that are less advantageous with regard to grain-oriented ferromagnetic materials, it is nevertheless more advantageous with respect to such materials in the embodiments of the present invention, since it does not require orienting the crystals along the axis of the pole pieces, which is reflected in a simplification of the manufacturing process and in a reduction of the manufacturing costs.

Preferably, the steps are obtained by means of automatic processes with automation devices capable of cutting and bending plates.

The technical problem is also solved by a process for making an electric motor in which an outer stator is manufactured according to the above-described method, a suitable inner rotor is manufactured, and the rotor and stator are mutually applied with the interposition of an appropriate air gap.

The characteristics and advantages of the invention will be clearer from the following description of several preferred embodiments, given as indicative and non-limiting with reference to the attached drawings.

BRIEF DESCRIPTION OF THE DRAWINGS

In such drawings:
FIG. 1 shows a side view of the laminar body for a first process embodiment according to the invention at the end of the first step;
FIG. 2 shows a plan view of the laminar body of FIG. 1;
FIG. 3 shows a reduced scale perspective view of the laminar body of FIG. 1;
FIG. 4 shows a side view of the laminar body of FIG. 1 at the end of the second step of the first process embodiment according to the invention;
FIG. 5 shows a plan view of the laminar body of FIG. 4;
FIG. 6 shows a reduced scale perspective view of the laminar body of FIG. 4;
FIG. 7 shows a side view of the laminar body of FIG. 1 at the end of the third step of the first process embodiment according to the invention;
FIG. 8 shows a plan view of the laminar body of FIG. 7;
FIG. 9 shows a reduced scale perspective view of the laminar body of FIG. 7;
FIG. 13 shows a side view of a laminar body for a second process embodiment according to the invention at the end of the first step;
FIG. 14 shows a plan view of the laminar body of FIG. 13;
FIG. 15 shows a reduced scale perspective view of the laminar body of FIG. 13;
FIG. 16 shows a side view of the laminar body of FIG. 13 at the end of the second step of the second process embodiment according to the invention;
FIG. 17 shows a plan view of the laminar body of FIG. 16;
FIG. 18 shows a reduced scale perspective view of the laminar body of FIG. 16;
FIG. 19 shows a side view of the laminar body of FIG. 13 at the end of the third step of the second process embodiment according to the invention;
FIG. 20 shows a plan view of the laminar body of FIG. 19;
FIG. 21 shows a reduced scale perspective view of the laminar body of FIG. 19;
FIG. 22 shows a motor made according to the invention with the laminar body of FIG. 13;
FIG. 23 shows a section view along the line XXIII-XXIII of FIG. 22;
FIG. 24 shows a reduced scale perspective view of the motor of FIG. 22;
FIG. 25 shows a side view of a two-layer laminar body for a third process embodiment according to the present invention at the end of the first step;
FIG. 26 shows a plan view of the laminar body of FIG. 25;
FIG. 27 shows a reduced scale perspective view of the laminar body of FIG. 25;
FIG. 28 shows a side view of the laminar body of FIG. 25 at the end of the second step of the third process embodiment according to the invention;
FIG. 29 shows a plan view of the laminar body of FIG. 28;
FIG. 30 shows a reduced scale perspective view of the laminar body of FIG. 28;
FIG. 34 shows a motor made according to the invention with the laminar body of FIG. 25;
FIG. 35 shows a section view along the line XXXV-XXXV of FIG. 34;
FIG. 36 shows a reduced scale perspective view of the motor of FIG. 34;
FIG. 37 shows a side view of a laminar modular element for a fourth process embodiment according to the invention;
FIG. 38 shows a side view of a laminar body composed of a modularity of modular elements of FIG. 37 at the end of the first step according to the fourth process embodiment according to the invention;
FIG. 39 shows a plan view of the laminar body of FIG. 38;
FIG. 40 shows a reduced scale perspective view of the laminar body of FIG. 38;
FIG. 41 shows a side view of the laminar body of FIG. 38 at the end of the second step of the fourth process embodiment according to the invention;
FIG. 42 shows a plan view of the laminar body of FIG. 41;
FIG. 43 shows a reduced scale perspective view of the laminar body of FIG. 41.

FIGS. 50-55 show, in views analogous to those of FIGS. 38, 41, 44, 47-49, a variant of the fourth embodiment for making a two-pole single-phase motor;

FIGS. 56-61 show, in views analogous to those of FIGS. 38, 41, 44, 47-49, a further variant of the fourth embodiment for making a three-phase motor.

DETAILED DESCRIPTION

Figure 11:
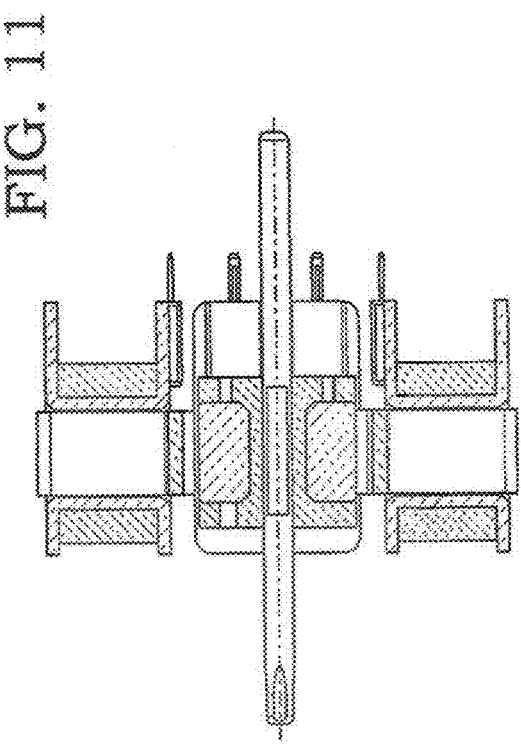
FIG. 11 shows a section view along the line XI-XI of FIG. 10.

With reference to FIGS. 1-12, a preferred embodiment of the present invention is illustrated, adapted to make an outer stator for a synchronous four-pole electric motor, for example two-phase or single-phase depending on the electrical connections of the coils surrounding the poles.

Such first step consists of bending a laminar strip, not illustrated since it is conventional, of rectangular thickness so as to form a laminar body 1, composed of a single layer of thickness S of ferromagnetic material. Such laminar body 1 has a rectangular base 60 of elongated form, with long sides of length L much greater than the short sides, which measure H; the short sides represent the lateral ends 10 of the laminar body 1. The laminar body 1 comprises a main face 3 opposite a secondary face 4. The main face is provided with four laminar protrusions 2 of height B and thickness 2S, perpendicular to said main face 3 and separated two-by-two by a distance A. In the specific example, L=98 mm, A=23 mm, B=15 mm, S=0.5 mm, with normal tolerances.

At the end of said first step, the laminar body 1 appears as it does in FIGS. 1-3.

The process includes a second step of inserting a coil 5 of conductive material around each laminar protrusion 2. Each coil 5 is wound around a reel 6, of insulating and non-magnetic material, such as for example a self-extinguishing plastic, which is inserted on the respective laminar protrusion 2 so as to support the coil 5 surrounding the respective laminar protrusion 2.

At the end of the second step, the laminar body 1 appears as it does in FIGS. 4-6.

The process includes a third step of deforming, in particular due to the use of a bending machine, the terminal zones 7 of the laminar protrusions 2, such that the terminal zones have bent form. Each terminal zone 7 has a height C determined by a protrusion bend line 8, illustrated in FIG. 4. In the specific example C=5 mm.

The terminal zone 7 is curved towards and is capable of enclosing an external cylindrical surface. The terminal zone 7, thus, becomes a tongue 32 with a curved forward surface 30, and a back surface 31 in contact with the reel 6 such that the reel 6 cannot be extracted from the laminar protrusion 7.

At the end of the third step, the laminar body 1 appears as it does in FIGS. 7-9.

The process includes a fourth step of closing the laminar body 1 in a ring, so that the main face 3 is turned inwardly, the secondary face 4 is in external position and the laminar protrusions are placed in internal position.

Such fourth step comprises the following two operations:
a first operation of carrying out eight bends on said laminar body 1, each of which at 45° in eight laminar body bend lines 9, illustrated in FIG. 7, so that the lateral ends 10 of the laminar body 1 can be brought into mutual contact;
a second operation of fixing the lateral ends 10 of the laminar body 1 such that the laminar body 1 assumes an annular form.

Figure 12:
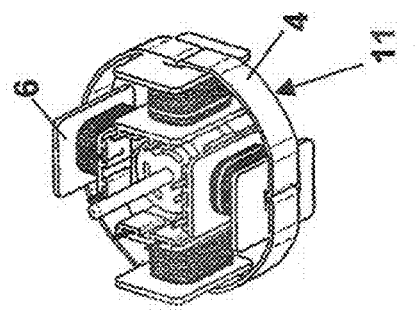
FIG. 12 shows a reduced scale perspective view of the motor of FIG. 10.
Figure 10:
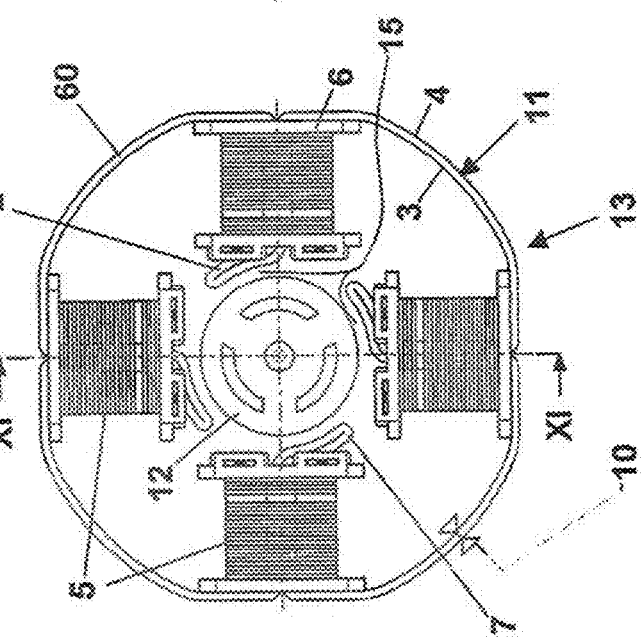
FIG. 10 shows an electric motor obtained with a stator made according to the invention.

At the end of the fourth step, one obtains a stator 11, illustrated in FIGS. 10-12.

With application of a suitable rotor 12 of permanent magnet type, spaced from the stator 11 by interposition of an air gap 15, it is thus possible to obtain a synchronous electric motor 13. The air gap 15 is externally delimited by the surfaces 30.

One such electric motor has the characteristic that the pole pieces are asymmetric, and, thus, the air gap is not uniform—such characteristic facilitates the self-starting of the synchronous electric motor.

In addition, advantageously, such motor is simply made without even cutting operations, which represents a considerable simplification of the motor manufacturing process.

Moreover, the stator is such that there is no separation between tongues 32 (which form the pole pieces of the stator poles), which are thus all integrally formed, so as to minimize the reluctance of the magnetic path between the stator poles.

With reference to FIGS. 13-24, a second process embodiment is illustrated according to the present invention, capable of making an outer stator for a four-pole synchronous electric motor, for example two-phase or single-phase.

The process includes a first bending step of a laminar strip, not illustrated since conventional, so as to prepare a laminar body 101, for example equal or similar to the abovementioned laminar body 1, composed of a single layer of thickness S of ferromagnetic material. Such laminar body 101 has a base 160 of substantially elongated rectangular form, with long sides of length L much greater than the short sides which measure H; the short sides represent the lateral ends 110 of the laminar body 101. The laminar body 101 comprises a main face 103 opposite a secondary face 104. The main face is provided with four laminar protrusions 102 of height B and thickness 2S, separated two-by-two by the distance A and perpendicular to said main face 103.

At the end of the first step, the laminar body 101 appears as it does in FIGS. 13-15.

The process includes a second step of inserting a coil 105 (which in the present embodiment is of the same type as said coils 5) of conductive material around each laminar protrusion 102. Each coil 105 is wound around a reel 106 (of the type for example as the aforesaid reels 6).

At the end of the second step, the laminar body 101 appears as it does in FIGS. 16-18.

The process includes a third step of deforming the terminal zones 107, of height C, of the laminar protrusions 2, such that the terminal zones 107 have bent form.

Said third step of deforming the terminal zones 107 of the laminar protrusions 103 comprises cutting and bending operations.

The cutting operation of each of the terminal zones 107 occurs by means of a cutting of the cutting line 108, which is on the outer top of each laminar protrusion 107. The cutting is made, for example, with a cutting machine, for example of blade type, with an action of approaching towards the laminar body 101.

The operation of bending the terminal zones 107 is such to carry out a bending of the terminal zones 107 so as these diverge and, at the same time, assume an outwardly curved form, adapted to enclose an external cylindrical surface.

The terminal zone 107 is subdivided into two tongues 132, each of which has a curved forward surface 103 and a curved back surface 131.

Thus, the back surface 131 is in contact with the reel 106 such that the reel 106 cannot be extracted from the laminar protrusion 107. In turn, the reel 106 locks the tongues 132, which thus remain locked.

At the end of the third step, the laminar body appears as it does in FIGS. 19-21.

The process includes a fourth step of closing the laminar body 101 in a ring, so that the main face 103 is turned inwardly and the secondary face 104 is in external position.

Such fourth step comprises the following two operations:
- a first operation of carrying out eight bends (two bends for each laminar protrusion 102) on said laminar body 101, each of which at 45° in eight laminar body bend lines 109, illustrated in FIG. 19, so that the lateral ends 110 of the laminar body 101 can be brought into mutual contact;
- a second operation of fixing the lateral ends 110 of the laminar body 101 such that the laminar body 1 assumes an annular form in a stable manner.

At the end of the fourth step, one obtains a stator 111, illustrated in FIGS. 22-24.

With application of a suitable rotor 112 of permanent magnet type, spaced from the stator 111 by interposition of an air gap 115, it is thus possible to obtain a synchronous electric motor 113, of single-phase or two-phase type depending on the connection of the coils 105. The air gap 115 is externally delimited by the surfaces 130.

The greatest advantage of the present invention consists of the simplicity of making the stator and the electric motor.

With reference to FIGS. 25-36, a third process embodiment is illustrated according to the present invention, adapted to make an outer stator for a four-pole synchronous electric motor, for example two-phase or single-phase depending on the electrical connections of the coils surrounding the poles.

The process includes a first step which consists of bending a double laminar strip, so as to prepare a laminar body 201 comprising two layers, each of which with thickness S; of ferromagnetic material. Such laminar body 201 has a rectangular base 260 of elongated form, with long sides much greater than the short sides; the short sides represent the lateral ends 210 of the laminar body 201. The laminar body 201 comprises a main face 203 opposite a secondary face 204. The main face 203 is provided with four laminar protrusions 202 of height B and thickness 4S, perpendicular to the main face 203.

At the end of the first step, the laminar body 201 appears as it does in FIGS. 25-27.

The process includes a second step of inserting a coil 205 (similar to the coils 5) on each laminar protrusion 202, each coil 205 being wound around a respective reel 206 (similar to the aforesaid reels 6), which is fixed to the respective laminar protrusion 202.

At the end of the second step, the laminar body 201 appears as it does in FIGS. 28-30.

The process includes a third step of deforming the terminal zones 207, of the laminar protrusions 202, such that the terminal zones 207 have bent form, in particular outwardly curved.

Said third step of deforming the terminal zones 207 of the laminar protrusions 202 comprises both a cutting and a bending operation.

The cutting operation of each of the terminal zones 207 occurs by means of a cutting of the cutting line 208, which is found on the outer top of each laminar protrusion 207. The cutting is made, for example, with a cutting machine, for example of blade type, with an action of approaching towards the laminar body 201.

The bending operation of the terminal zones 207 is such to carry out a bending of such terminal zones 207 so as to ensure that these diverge and, at the same time, assume an outwardly curved form, adapted to enclose an external cylindrical surface.

The terminal zone 207 is outwardly curved and capable of enclosing an external cylindrical surface. The terminal zone 207 is subdivided into two tongues 232, each of which has a curved forward surface 203 and a curved back surface 231.

Thus, the back surface 231 is in contact with the reel 206 such that the reel 206 cannot be extracted from the laminar protrusion 207. In turn, the reel 206 locks the tongues 232.

Figure 31:
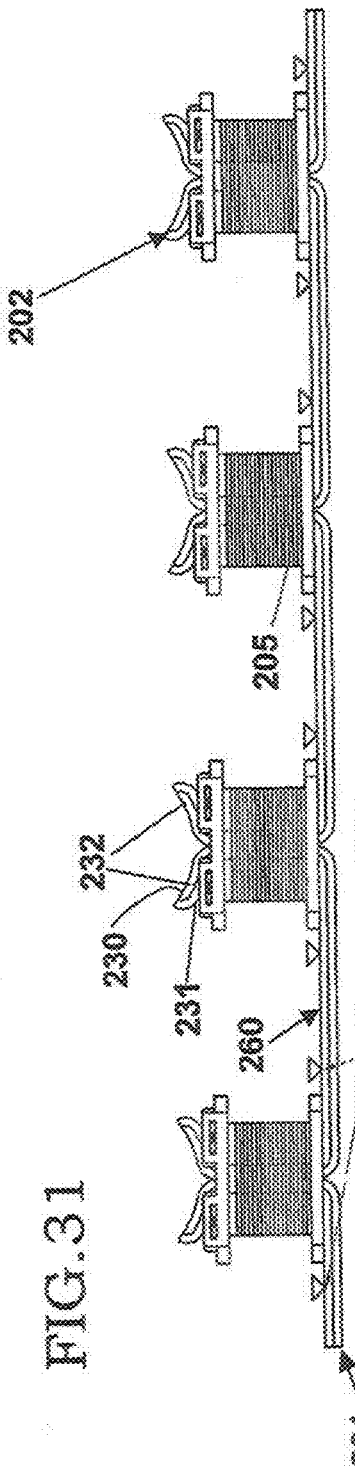
FIG. 31 shows a side-view of the laminar body of FIG. 25 at the end of the third step of the third process embodiment according to the invention.
Figure 32:
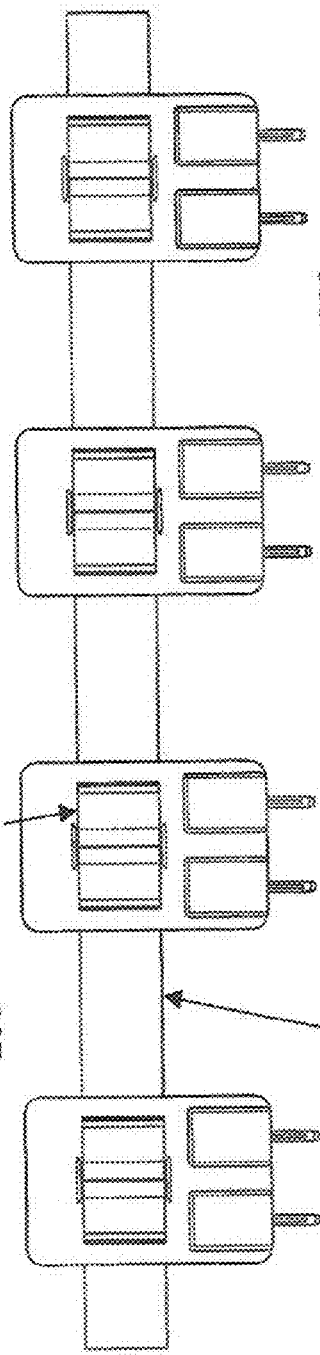
FIG. 32 shows a plan view of the laminar body of FIG. 31.
Figure 33:
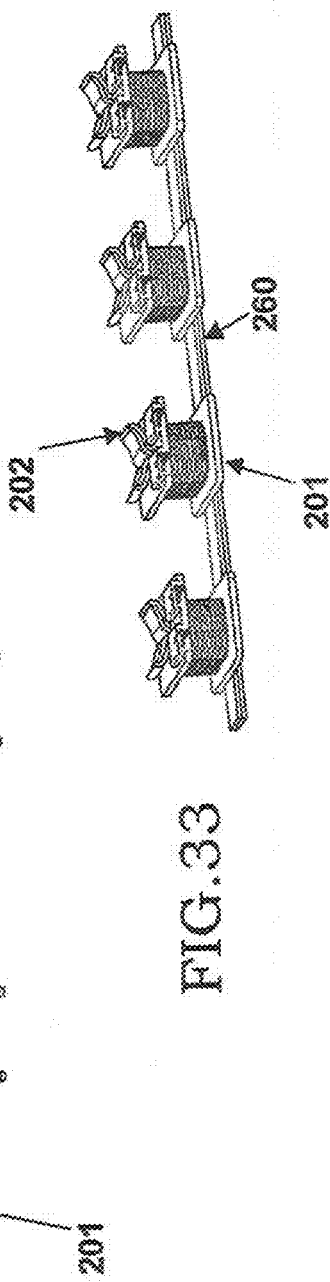
FIG. 33 shows a reduced scale perspective view of the laminar body of FIG. 31.

At the end of the third step, the laminar body appears as it does in FIGS. 31-33.

The process includes a fourth step of closing the laminar body 201 in a ring, so that the main face 203 is situated in an inward position, the secondary face 104 in external position, and finally the laminar protrusions 202 are internal.

Such fourth step comprises the following operations:
- a first operation of carrying out eight bends on said laminar body 201, each of which at 45° in eight laminar body bend lines 209, illustrated in FIG. 31, so that the lateral ends 210 of the laminar body 201 can be brought into mutual contact;
- a second operation of fixing the lateral ends 210 of the laminar body 201 such that the laminar body 201 is locked in annular position.

At the end of said fourth step, one obtains a stator 211, wherein each laminar protrusion 202 acts as a stator pole.

With application of a suitable rotor 212, spaced from the stator 211 by an air gap 215, it is thus possible to obtain a synchronous electric motor 213 of single-phase or two-phase type depending on the connection of the coils 205.

The motor thus obtained is advantageously simple to make, but the fact that it is composed of a double layer of ferromagnetic material allows diminishing the eddy currents, thus obtaining a good efficiency.

Embodiment variants of the present process can provide for the use of an even higher number of layers of ferromagnetic material; with the increase of the number of layers, there corresponds a further diminution of the eddy currents and thus an increased efficiency of the motor thus obtained.

With reference to FIGS. 37-49, a fourth process embodiment is illustrated according to the present invention, capable of making an outer stator for a four-pole synchronous electric motor, for example two-phase or single-phase.

The process comprises a first step of preparing a laminar body with the use of modular laminar elements 320 (FIG. 37).

Said first step comprises first operation of preparing a plurality of modular laminar elements 320, each of which comprises a central plate 321 and a pair of lateral plates 322.

In addition, end laminar elements 325 are employed, which are formed by dividing a modular element 320.

In the present embodiment, three modular elements 320 are two end elements 325 are employed.

The first step also comprises a second modular application operation of the modular laminar elements 320 by means of juxtaposition at the lateral plates 322 so as to form laminar protrusions 302; in the lateral ends of the laminar body 301, the laminar end elements 325 are instead employed, which contribute to forming laminar protrusions 302.

Thus, as is visible in FIGS. 38-40, the modular body 301 essentially appears formed by a single-layer of thickness S, made of ferromagnetic material. Such laminar body 301 has a rectangular base 360 of elongated form, with long sides of length L much greater than the short sides, which measure H; the short sides represent the lateral ends 310 of the laminar body 301. The laminar body 301 comprises a main face 303 opposite a secondary face 304. The four laminar protrusions 302 are of height B and thickness 2S, separated two-by-two by the distance A and perpendicular to said main face 303.

The process includes a second step of inserting a coil 305 (of the same type as the aforesaid coils 5) of conductive material around each laminar protrusion 302. Each coil 305 is wound around a reel 306 (similar to the aforesaid reels 6), which is fixed to the respective laminar protrusion 302.

At the end of the second step, the laminar body 301 appears as it does in FIGS. 41-43.

The process includes a third step of deforming the terminal zones 307, of the laminar protrusions 302, such that the terminal zones 307 have bent form.

Said third step of deforming the terminal zones 307 of the laminar protrusions 302 comprises separating and bending operations.

The separation operation of each of the terminal zones 307, of height C, occurs by means of a separation of the separation line 308, which is found on the outer top of each laminar protrusion 307. The separation is carried out, for example, with blade means with an action of approaching towards the laminar body 301.

The bending operation of the terminal zones 307 is such to carry out a bending of such terminal zones 307 so that these diverge and, at the same time, assume an outwardly curved form, adapted to enclose an external cylindrical surface.

The terminal zone 307 is outwardly curved and capable of enclosing an external cylindrical surface. The terminal zone 307 is subdivided into two tongues 332, each of which has a curved forward surface 330 and a curved back surface 331.

Thus, the back surface 331 is in contact with the reel 306 such that the reel 306 cannot be extracted from the laminar protrusion 307. In turn, the reel 306 locks the tongues 332, which thus remain locked.

Figure 44:
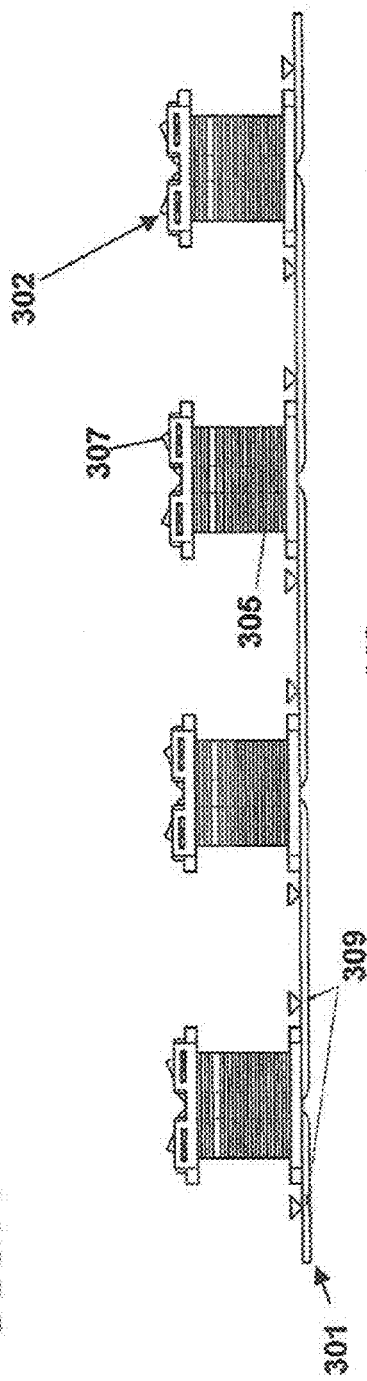
FIG. 44 shows a side view of the laminar body of FIG. 38 at the end of the third step of the fourth process embodiment according to the invention.
Figure 45:
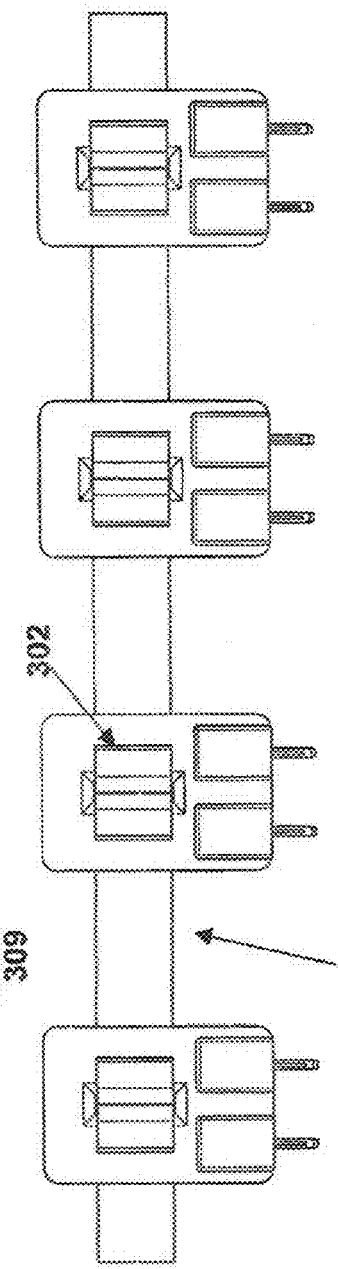
FIG. 45 shows a plan view of the laminar body of FIG. 44.
Figure 46:
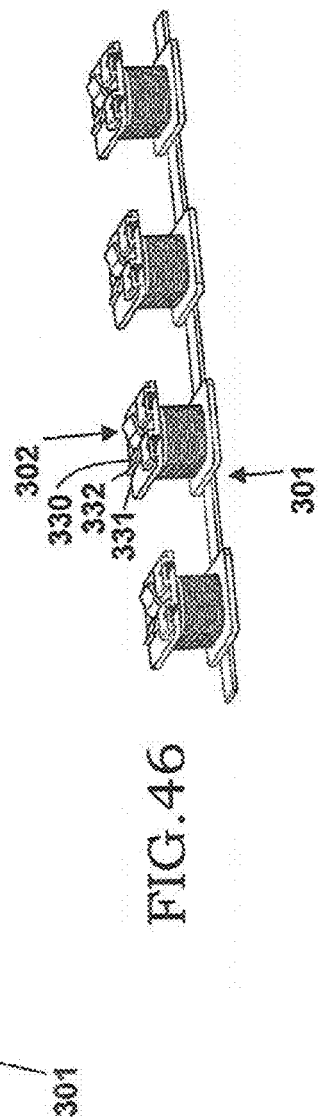
FIG. 46 shows a reduced scale perspective view of the laminar body of FIG. 44.
Figure 49:
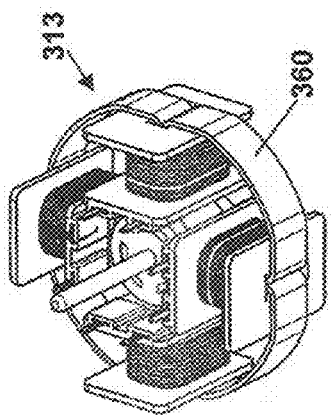
FIG. 49 shows a reduced scale perspective view of the motor of FIG. 47.
Figure 48:
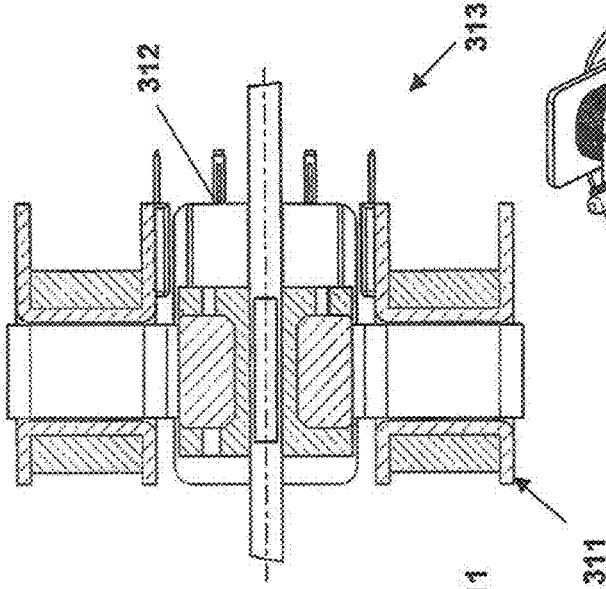
FIG. 48 shows a section view along the line XLVIII-XLVIII of FIG. 47.
Figure 47:
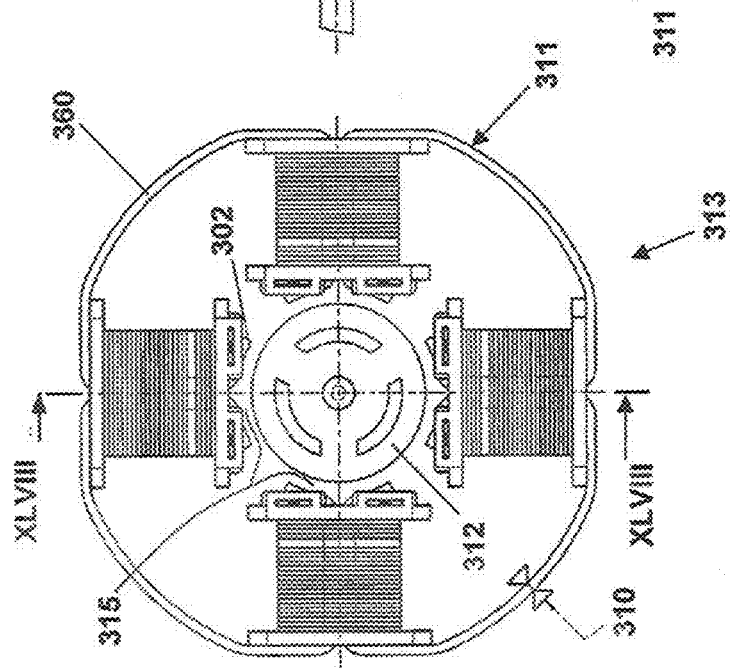
FIG. 47 shows the motor made according to the invention at the end of the fourth process embodiment.

At the end of the third step, the laminar body appears as it does in FIGS. 44-46.

The process includes a fourth step of closing the laminar body 301 in a ring, so that the main face 303 is situated in an internal position, the secondary face 304 in external position.

Such fourth step comprises the following two operations:
a first operation of carrying out eight bends on the laminar body 301, each of which at 45° in eight laminar body bend lines 309, illustrated in FIG. 44, so that the lateral ends 310 of the laminar body 301 are brought into mutual contact;
a second operation of fixing the lateral ends 310 of the laminar body 301 such that the laminar body 301 has a stably annular form.

At the end of the fourth step, one obtains a stator 311, whose poles are formed by the laminar protrusion 302.

With application of a suitable rotor 312 of permanent magnet type and separated by means of an air gap 315, it is thus possible to obtain a synchronous electric motor 313.

The greatest advantage of the present embodiment of the present invention lies in its modularity: in this manner, it is possible to first proceed with the preparation of the modular elements, then with making the stator at a later time.

With reference to FIGS. 50-55, it is possible to see how the fourth embodiment of the process according to the invention can also be employed for making a single-phase two-pole synchronous electric motor 413.

The following are used: a modular laminar element 420 which comprises a central plate 421 and two lateral plates 422 perpendicular thereto, and two modular end elements 425, for example formed by cutting a further modular element.

In FIG. 50, a laminar body 401 is visible at the end of the first process step, with a base 460 formed by a juxtaposition of the modular laminar element 420 with the two end elements 425.

In FIG. 51, the laminar body 401 is visible at the end of the second process step, i.e. after the application, on the laminar protrusions 402, of reels 406 with coils 405 pre-wound on the reels 406.

In FIG. 52, the laminar body 401 is visible at the end of the third step of the process, i.e. after the deformation of the laminar ends 407 placed on the top of the laminar protrusions 402. Such deformation occurs by separation and deformation of the laminar ends 407, such that such laminar ends 407 are configured as a pair of tongues 432 with a forward surface 430 and a back surface 431, so as to enclose an external cylindrical element. The back surface 431 is in contact with the reel 406 such that the reel 406 cannot be extracted from the laminar protrusion 407. In turn, the reel 406 locks tongues 432, which thus remain locked.

Afterwards, in the fourth process step, four 90° bends are carried out on the laminar body 401, such that the ends 410 of the laminar body 401 are brought into mutual contact. The final fixing of the ends 410 allows making a stator 411 with substantially rectangular conformation; such stator 411, once coupled with a suitable rotor 412 of permanent magnet type and with interposition of an appropriate air gap 415, forms a single-phase synchronous electric motor 413.

It has to be observed that each tongue 432 of every stator pole is formed integrally with a respective tongue 423 of the other stator pole: this simplifies the flux passage by diminishing the reluctance of the magnetic path, since there are no material interruptions in the magnetic path.

With reference to FIGS. 56-61, it is possible to see how the fourth embodiment of the process according to the invention can be employed for making a three-phase three-pole electric motor 513.

The following are used: two modular laminar element 520, each of which comprises a central plate 521 and two lateral plates 522 perpendicular thereto, and two modular end elements 525, obtained for example by cutting a further laminar modular element 520.

In FIG. 56, a laminar body 501 is visible at the end of the first process step, with a base 560 and three protrusion elements 502 formed by a juxtaposition of the modular laminar elements 520 and the modular end elements 525.

In FIG. 57, the laminar body 501 is visible at the end of the second process step, i.e. after the application, on the laminar protrusions 502, of reels 506 with coils 505 pre-wound on the reels 506.

In FIG. 58, the laminar body 501 is visible at the end of the third step of the process, i.e. after the deformation of the laminar ends 507 placed on the top of the laminar protrusions 502. Such deformation occurs by separation and deformation of the laminar ends 507, which come to be configured as a pair of tongues 532 with a forward surface 530 and a back surface 531, so as to enclose an external cylindrical element. The back surface 531 is in contact with the reel 506 such that the reel 506 cannot be extracted from the laminar protrusion 507. In turn, the reel 506 locks tongues 532.

Afterwards, in the fourth process step, six 60° bends are carried out on the laminar body 501, such that the ends 510 of the laminar body 501 are brought into mutual contact. The final fixing of the ends 510 allows making a stator 511 which, once coupled with a suitable rotor 512, forms a three-phase synchronous electric motor 513.

With reference to all of the previously illustrated embodiments, it is to be noted that the laminar body is intended to become the stator, at the end of the process according to the invention; in particular, the base of the laminar body becomes the ferromagnetic core of the stator, while the laminar protrusions become the stator poles.

The size of the stator depends on the maximum stator flux, which in turn depends on the ferromagnetic material composing the core and on the cross section area of the ferromagnetic core, i.e. on the cross section of the base of the laminar body. Therefore, if the necessary cross section area of the core is known, it is possible to size the laminar body.

With particular reference to a laminar body formed by a plurality of layers, the sizing of the laminar body can also be made with automatic calculation methods integrated into an automatic cutting and bending system employed for making, the stator. Thus, once the necessary area $\Sigma$ is determined, the laminar strip can be advantageously prepared according to the following operations:

preparing a laminar single-layer of predetermined thickness S;

cutting said laminar single-layer into n elongated rectangles with smaller side equal to H, such that the following relation is verified:

$$nH > \frac{\Sigma}{S}$$

fitting said elongated rectangles together so as to form the laminar strip with a plurality of layers employed for generating the laminar body or the modular laminar elements.

This is due to the fact that the cross section area of the base of the laminar body base, which is equal to nHS, must be greater than the section area $\Sigma$ necessary for allowing the required flux.

The fitting of the layers is preferably obtained by means of pressing the n layers.

In addition, by knowing the nominal speed of the electric motor and the power supply speed of the coils, it is also possible to establish the number of poles of the motor, since the motor is of synchronous type and its speed is necessarily correlated to the number of poles.

The invention also regards an outer stator, for example according to one of the preceding embodiments 11, 111, 211, 311, 411 or 511, respectively with poles 2, 102, 202, 302, 402 or 502 surrounded by coils for an electric motor, for example of synchronous type with permanent magnets. The outer stator is such that at least a part of the terminal zone 7, 107, 207, 307, 407 or 507 of each stator pole is formed integrally with at least a part of the terminal zone of an adjacent stator pole.

The invention also regards an electric motor 13, 113, 213, 313, 413 or 513 with the aforesaid outer stator and an inner rotor separated from the stator via interposition of an air gap.

The present invention allows the manufacturing of stators and electric motors in a completed automated manner.

The invention claimed is:

1. A process for manufacturing an outer stator for an electric motor, said stator comprising stator poles surrounded by coils, said process including the following steps:

preparing a laminar body, of ferromagnetic material with a base of elongated form and laminar protrusions, wherein said step of preparing the laminar body comprises:

preparing a plurality of modular laminar elements, each of which comprises a central plate and a pair of lateral plates, and arranging said modular laminar elements together by means of juxtaposition and/or mutual fixing of said lateral plates so as to form said laminar protrusions;

inserting a coil of conductive material around each of said laminar protrusions;

deforming the terminal zones of said laminar protrusions such that said terminal zones assume a bent form; and closing said laminar body such that said laminar protrusions are in internal position and adapted to serve as stator poles.

2. The process according to claim 1, wherein said step of preparing a laminar body consists of bending a laminar body, with the definition of said laminar protrusions.

3. The process according to claim 1, wherein said step of deforming the terminal zones of said laminar protrusions consists of bending said terminal zones.

4. The process according to claim 1, wherein said step of deforming the terminal zones of said laminar protrusions comprises:

a cutting and/or separation operation of said terminal zones; and a bending operation of said terminal zones.

5. The process according to claim 1, wherein each coil is wound around a reel inserted on said laminar protrusion.

6. The process according to claim 5, wherein, during said step of deforming the terminal zones, said terminal zones are deformed so to assume the configuration of tongues, with a curved forward surface capable of enclosing an external cylindrical surface, and a back surface in contact with said reel, so as to lock said reel.

7. The process according to claim 1, wherein said laminar body is formed by a single layer.

8. The process according to claim 1, wherein said laminar body is formed by a plurality of layers or a multiple layer of ferromagnetic material.

9. The process according to claim 8, wherein the step of preparing the laminar elements comprises bending a laminar strip having a plurality of layers, said laminar strip being formed by:

preparing a single-layer lamina of predetermined thickness S;

cutting said single-layer lamina into n elongated rectangles with smaller sides equal to H, such that the following relation is verified:

$$nH > \frac{\Sigma}{S}$$

wherein $\Sigma$ is the cross section area of the ferromagnetic core necessary for the maximum flux required by the stator; and fitting said n elongated rectangles together so as to form the laminar strip having a plurality of layers.

10. The process according to claim 8, wherein said laminar body is formed by two layers of ferromagnetic material.

11. A process for making an electric motor comprising manufacturing an outer stator according to claim 1, manufacturing of a suitable inner rotor and finally the mutual application of rotor and stator with interposition of an appropriate air gap.

12. The process according to claim 1, wherein said laminar body is formed of traditional iron.

13. The process according to claim 1, wherein said terminal zones of said laminar protrusions are deformed into an outwardly curved form.

14. A process for manufacturing an outer stator for an electric motor, said stator comprising stator poles surrounded by coils, said process including the following steps:
   preparing a laminar body of ferromagnetic material, with a base of elongated form and laminar protrusions;
   inserting a coil of conductive material around each of said laminar protrusions;
   deforming the terminal zones of said laminar protrusions such that said terminal zones assume a bent form, wherein said deforming step comprises a cutting and/or separation operation of said terminal zones, and a bending operation of said terminal zones; and
   closing said laminar body such that said laminar protrusions are in internal positions and are adapted to serve as stator poles.

15. The process according to claim 14, wherein said laminar body is formed of traditional iron.

16. The process according to claim 14, wherein said terminal zones of said laminar protrusions are deformed into an outwardly curved form.

17. The process according to claim 14, wherein the step of preparing the laminar body comprises bending a laminar strip having a plurality of layers, said laminar strip being formed by:
   preparing a single-layer lamina of predetermined thickness S;
   cutting said single-layer lamina into n elongated rectangles with smaller sides equal to H, such that the following relation is verified:

$$nH > \frac{\Sigma}{S}$$

wherein $\Sigma$ is the cross section area of the ferromagnetic core necessary for the maximum flux required by the stator; and
   fitting said n elongated rectangles together so as to form the laminar strip having a plurality of layers.

* * * * *